(12) United States Patent
Kikinis

(10) Patent No.: US 6,603,762 B1
(45) Date of Patent: Aug. 5, 2003

(54) SYSTEM FOR CONTROLLING PROCESSING OF DATA PASSING THROUGH NETWORK GATEWAY BETWEEN TWO DISPARATE COMMUNICATIONS NETWORK

(75) Inventor: Dan Kikinis, Saratoga, CA (US)

(73) Assignee: Lextron Systems, Inc., Saratoga, CA (US)

(*) Notice: Subject to any disclaimer, the term of this patent is extended or adjusted under 35 U.S.C. 154(b) by 0 days.

(21) Appl. No.: 09/524,052

(22) Filed: Mar. 13, 2000

Related U.S. Application Data

(60) Provisional application No. 60/124,240, filed on Mar. 12, 1999.

(51) Int. Cl.[7] .............................................. H04L 12/66
(52) U.S. Cl. ...................................... 370/352; 370/355
(58) Field of Search ................................ 370/351–358, 370/493–494

(56) References Cited

U.S. PATENT DOCUMENTS 6,075,783 A * 6/2000 Voit ............................ 370/352
6,128,379 A * 10/2000 Smyk ......................... 379/230

* cited by examiner

Primary Examiner—Wellington Chin
Assistant Examiner—Brenda Pham
(74) Attorney, Agent, or Firm—Donald R. Boys; Central Coast Patent Agency, Inc.

(57) ABSTRACT

A control system is provided for controlling the aspects of data conversion and routing of data passing between two disparate communications networks. The system operates from a network-connected computer node running a software application. The computer node acquires the data protocol associated with the data en-route from one network to another and using the software application, formulates the required conversion commands and routing instructions based on information provided by the protocol signal. The generated commands are routed to the appropriate conversion nodes through which the data will pass into the next network. The conversion nodes apply the commands routed to them by the computer node to the appropriate data passing through the nodes. In one application, the control system combines the total hardware and software functions of the computer node and the conversion nodes and is provided to operate from one network-connected node.

2 Claims, 4 Drawing Sheets

SYSTEM FOR CONTROLLING PROCESSING OF DATA PASSING THROUGH NETWORK GATEWAY BETWEEN TWO DISPARATE COMMUNICATIONS NETWORK

This application claims the benefit of provisional application No. 60/124,240, filed Mar. 12, 1999.

FIELD OF THE INVENTION

The present invention is in the field of telephony communications and network bridging services and pertains more particularly to methods and apparatus for controlling data-conversion capability and protocol-command compatibility for network-bridging services.

BACKGROUND OF THE INVENTION

The field of telephony now includes connection-oriented switched telephony (COST) systems, which are the well-known conventional intelligent networks provided by major telephone companies, as well as data network telephony (DNT), which are the computer-simulated telephone services provided typically in the Internet, by virtue of rather recent technology contributed to the art enabling transparent bridging between a COST telephony network and a Data-Packet-Network (DPN) like the Internet. With the advent of such technologies, ISPs have become more prevalent and much more competitive with one another. A typical ISP provides Internet connection services for clients operating Internet-capable appliances enabled to connect to the Internet over usually telephone lines. However, with many more ISPs competing for clients, value-added services (VAS) have been developed in accordance with available and emerging technologies. One of these services is a capability of bridging a COST network to an Internet Protocol (IP) network for bi-directional data and voice communication.

In current art, ISPs use a typically standard set of system units or nodes to provide connectivity and telephony bridging services. One of these system nodes is termed a portmaster in the art, and another is commonly referred to as a Voice-over-Internet-Protocol (VoIP) Gateway. These nodes are more commonly referred to as network gateways or bridges. In typical implementation, one local telephone company (TELCO) carrier, which may be registered as an Incumbent-Local-Exchange-Carrier (ILEC), an Inter-Carrier-Exchange (ICX), or a Competing-Local-Exchange-Carrier (CLEC) operates switching apparatus, which may be a Public Access Branch Exchange (PABX), or another compatible switching apparatus. The PABX hosted by a local TELCO carrier is typically connected to the Portmaster nodes and the VoIP nodes of an ISP providing bridging services as described above. A plurality of PABX or other compatible switching apparatus are interconnected in the telephony network, but are hosted by separate TELCOs and are connected to separate ISP system-nodes.

More recently, many ISPs have registered as CLECs for the purpose of being able to charge other TELCOs for connection termination services. Such ISPs use the acquired fees to subsidize other standard services. A well-known standard SS-7 protocol (defined in the ITU intelligent networks and Bell standards) is typically employed between connected switches of competing TELCOs. In standard practice, an originating TELCO charges a customer for call origination and call delivery. However, the delivery share of the customer's bill is regulated to go to a receiving TELCO or in this case an ISP registered as a CLEC. If an ISP registered as a CLEC provides VoIP services, it would have to pay termination fees, for example, to a receiving TELCO registered as an ILEC for calls delivered to the telephone network. The fees, charged back and forth by these entities work to elevate telephone-connection costs and ISP services to customers.

What is clearly needed is a virtual switch-and-command system for providing data processing and routing instruction directly to network gateway nodes according to prevalent protocols, thus eliminating the need for a local TELCO switch. Such a method would enable cost savings related to the equipment costs, maintenance costs, and connection termination costs associated with a local switch. Cost savings realized may be passed on to customers creating a more competitive and attractive service provider.

SUMMARY OF THE INVENTION

In a preferred embodiment of the present invention an Internet service provider (ISP) system registered as a Competing-Local-Exchange-Carrier (CLEC) is provided, comprising a channel bank for receiving calls from a connection oriented switched telephony (COST) network, and separating the calls into separate channels; at least one VoIP gateway connected to an Internet router and to one channel of the channel bank for converting voice call data between a COST protocol and Internet protocol; at least one portmaster (PM) node connected to the Internet router and to one channel of the channel bank for converting non-voice data between the COST protocol and the Internet protocol; and a computer station executing a virtual switch (VS) software, the computer station connected to the Internet router and to the channel bank. The system is characterized in that the computer station controls, via the VS software, the channel bank for separating the COST calls into the separate channels, and also receives and shares SS-7 commands and data with the VoIP gateway and the PM node via the Internet router connected to the PM node and the VoIP gateway, thereby avoiding use of a telephony switching apparatus for receiving and routing calls from the COST network.

In another aspect of the invention a method for handling voice and non-voice data calls at an Internet Service Provider (ISP) site between a connection-oriented switched telephony (COST) network and the Internet, without handling the COST calls by a COST switch local to the ISP site is provided, the method comprising steps of (a) substituting a channel bank for the COST switching apparatus local to the ISP; (b) operating the channel bank by a computer station in the ISP site, the computer station executing a virtual switch software, to channel incoming COST calls to individual ones of Voice-Over-IP (VoIP) and Portmaster gateways connected to an Internet router; and (c) sharing SS-7 commands and data from the COST network with the VoIP and Portmaster gateways by the computer station through a link to the Internet router.

The method and apparatus of the invention, taught in enabling detail below in several embodiments, for the first time provides a system for eliminating use of a local telephone switch for handling calls to individual gateways in an ISP.

BRIEF DESCRIPTION OF THE DRAWING FIGURES

DESCRIPTION OF THE PREFERRED EMBODIMENTS

Figure 1:
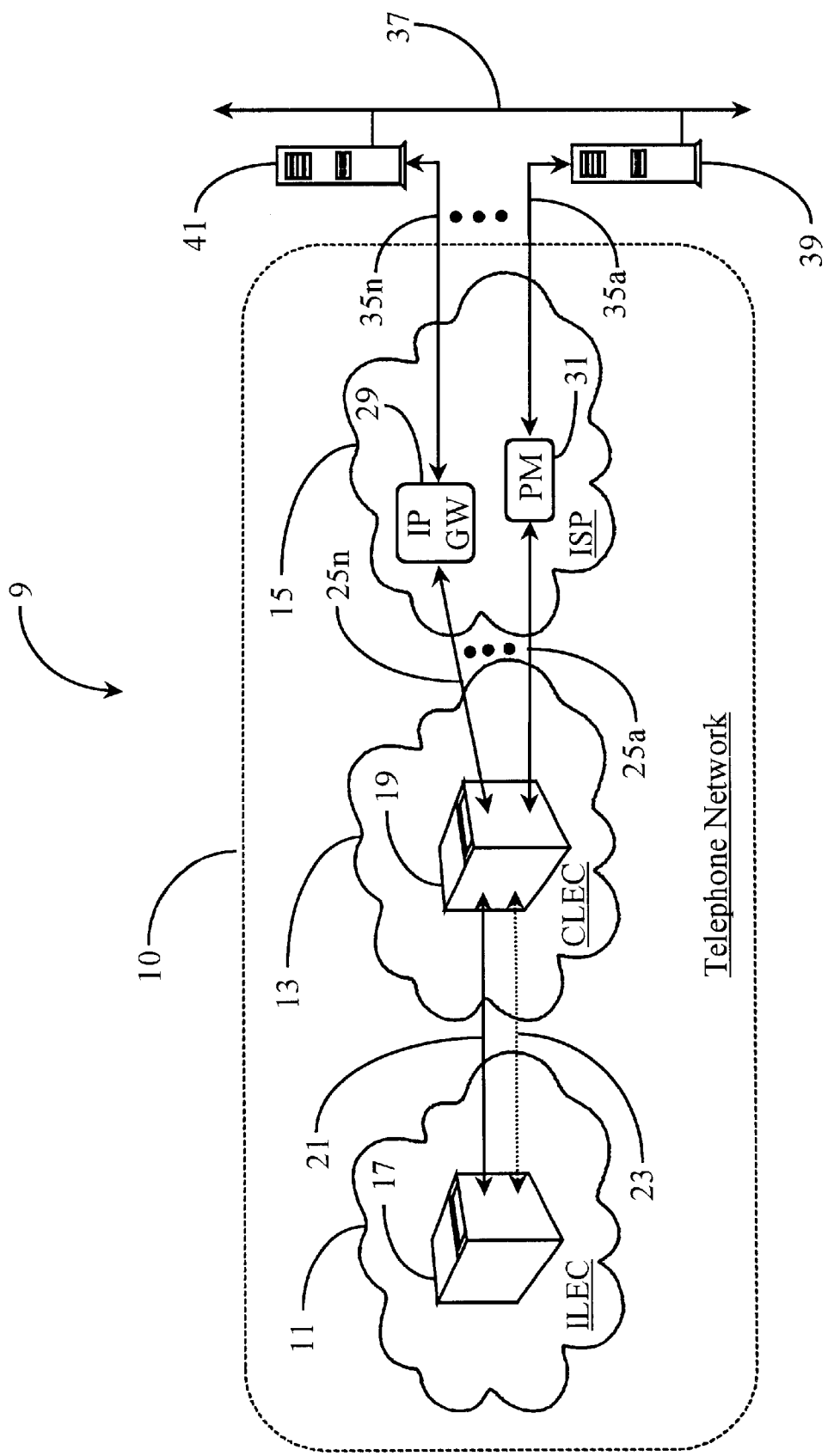
FIG. 1 is an architectural overview of a telephone exchange system and connected network-bridging service according to prior art.

FIG. 1 is an overview of a telephone exchange system 9 including a connected network-bridging service 15 according to prior art. Telephone-exchange network 9 comprises three separate entities. These are an ILEC 11, a CLEC 13, and an ISP 15. The three described entities typically operate in a telephone network 10, represented herein by a dotted boundary labeled telephone network. A Public-Switched-Telephony-Network (PSTN) or a private telephone network may be represented by domain 10.

An Internet Protocol (IP) backbone 37 is illustrated logically outside of domain 10, and represents an Internet backbone or another suitable Wide-Area-Network (WAN) backbone, which supports IP. In this case backbone 37 is the well-known Internet backbone and its double arrows represent connection to other backbones and other portions of the Internet network as a whole.

As described in the background section, ISP 15 provides gateway services for data and voice calls arriving from network 10 and entering network 37 or for data and voice calls arriving from backbone 37 and entering network 10. ISP 15 has a VoIP gateway node 29 and a portmaster node 31 resident therein and adapted to provide the above described gateway services. VoIP gateway 29 is adapted to bridge voice calls (VoIP) and portmaster 31 is adapted to bridge data communication.

A telephony switch 17 is illustrated within ILEC 11 and is adapted to perform telephony switching functions as are generally known in the art. Switch 17 is a PABX switch in this example. PABX 17 is hosted by a TELCO registered as an ILEC. A telephony switch 19 is illustrated within CLEC 13 and adapted to perform telephony switching functions as described with reference to switch 17. Switch 19 may also be assumed to be a PABX switch in this example. PABX 19 is hosted by a TELCO registered as a CLEC, which is geographically local to ISP 15. PABX 17 and PABX 19 are connected through telephone network 10 by a telephony trunk 21, which is adapted to carry voice calls and data communication. A dotted double-arrow illustrated between PABX 17 and PABX 19 represents logical SS-7 protocol capability between both switches as is known in the art. SS-7 signaling may be accomplished via a separate physical trunk or through trunk 21. In other applications, other standard protocols may be employed as are known in the art.

PABX 19 is further adapted to divide telephony trunk 21 on the ILEC side into a plurality of smaller trunks 25a–25n on the ISP side. In this example, trunk 25a connects PABX 19 to PM 31 for data calls. A trunk 25n connects PABX 19 to VoIP gateway 29 for VoIP calls. PM 31 is adapted to convert data events arriving from PABX 19 over to IP data events for IP delivery over backbone 37. VoIP gateway 29 is adapted to convert voice calls arriving from PABX 19 to VoIP calls for delivery over backbone 37. SS-7 protocol provides the rules and routing instruction for the gateway conversion and delivery of all events entering the network represented by backbone 37. Similarly, all IP events entering domain 10 from network 37 are converted and routed according to SS-7 protocol.

In this prior art example, an IP router 41, connected to backbone 37, represents a first IP routing point in the Internet network for voice calls arriving thereto from VoIP gateway 29 over a data trunk 35n. Similarly, an IP router 39, connected to backbone 37, represents a first routing point for all data events arriving thereto from PM 31 over a data trunk 35a. Trunks 35a–n represent local data trunks. It is recognized that there may be more gateways strategically connected between PABX 19 and IP routers 41 and 39 than are illustrated in this prior art example. The inventor illustrates only one PM 31 and one VoIP gateway 29 in this example for descriptive purpose in explanation of this simplified prior art configuration.

Figure 2B:
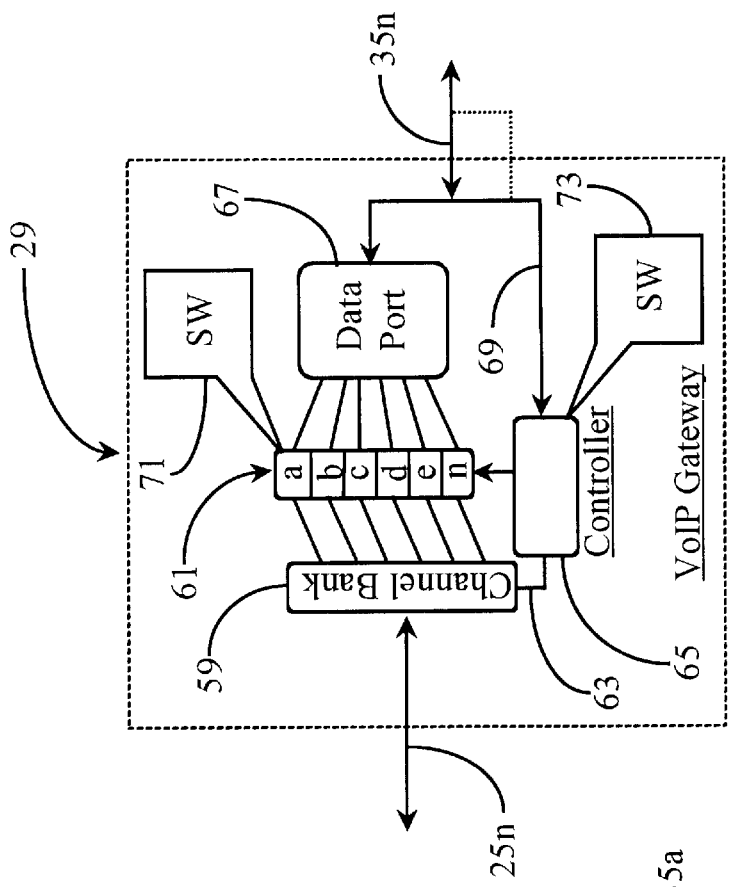
FIG. 2B is a block diagram illustrating components and function of a VoIP gateway according to prior art.
Figure 2A:
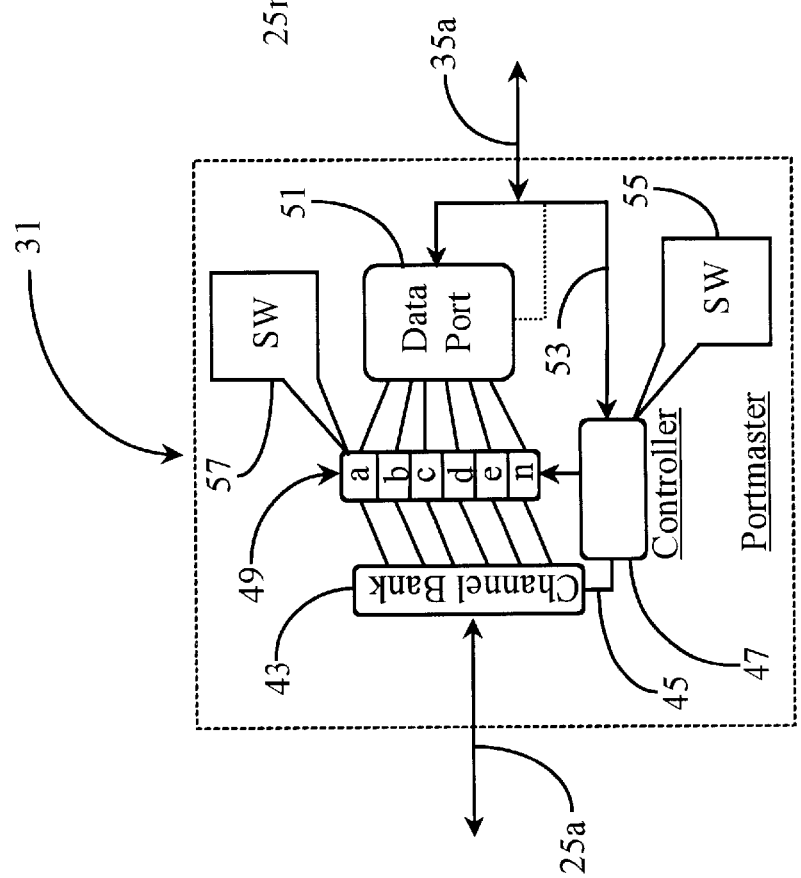
FIG. 2A is a block diagram illustrating components and function of a portmaster according to prior art.

FIG. 2A is a block diagram illustrating components and functions of PM 31 of FIG. 1. PM 31, as previously described, converts data communications and is a bi-directional gateway. Trunk 25a (taken from FIG. 1) represents all data events arriving to PM 31 or coming from PM 31 on the side of domain 10. A channel bank 43 is provided within PM 31 and functions to split trunk 25a into a plurality of channels or small groups of channels (one or more). Channel bank 43 is typically implemented as a software function for creating smaller channels or pipelines through which different types of data pass through for signal processing.

A Digital Signal Processing (DSP) array 49 comprises, in this example, DSP units a–n, which number one per channel created by channel bank 43. Each DSP unit a–n has an instance of DSP modem hardware and/or software illustrated herein as SW 57 executing thereon and adapted to terminate the analog modem leg for an assigned channel and to extract the pure data from each channel. A main controller 47 (hardware processor) is provided and is control-connected to bank 43 by control line 45. Controller 47 is also control-connected to DSP units a–n as illustrated herein by a directional arrow beginning at controller 47 and leading to DSP array 49. Controller 47 is also illustrated as connected to a data port 51 by a control line 53. Controller 47 handles all port supervisory duties, signaling function, call identification, security, and a host of other functions, which are known in the art. An instance of software (SW) 55 is provided to execute on controller 47 and represents the control program for managing the function of PM 31.

Data bound for IP transmission and processed by array 49 arrives at data port 51 over respective channels illustrated as solid lines connecting each of DSP units a–n to port 51. IP data from port 51 is passed as IP data packets over data trunk 35a to IP router 39 (FIG. 1) and is ready to be routed over network 37 (FIG. 1). Data coming into PM 31 from network 37 that is destined for domain 10 (FIG. 1) is processed in a reverse fashion accordingly.

FIG. 2B is a block diagram illustrating components and functions of VoIP gateway 29 of FIG. 1. VoIP gateway 29 is quite similar to PM 31 as far as architecture and main description of function. Trunk 25n represents bi-directional transmission of voice calls to, and voice calls from VoIP gateway 29. VoIP gateway 29 comprises a channel bank 59, a DSP array 61, a controller 65, a data port 67, and software (SW) instances 71 (DSP modem software), and 73 (control program). Control lines 63 (connecting controller 65 to channel bank 59), line 69 (connecting controller 65 to data port 67), and a directional arrow (illustrating control over DSP array 61) are also illustrated in the same fashion as in FIG. 2A.

A significant difference from VoIP gateway 29 and PM module 31 is that DSP processing is performed more on the IP side of things. For example, an instance of software 73 provided as a control program for VoIP gateway 29 acts to manage conversion of analog voice over to compressed VoIP data packets for IP transmission according typically to H.323 standard of the ITU. It can be appreciated that PM gateway 31 and VoIP gateway 29 are, other than the types of data they handle and software available for process control, very similar in architecture.

The inventor has illustrated and described the prior art above in order that one with skill in the art will appreciate the expense involved, as well as the complicated trunking and channeling required to provide adequate gateway services, which in actual practice, is more complex than the simple configuration described in FIG. 1.

A main goal of the present invention is to allow an ISP or other service-providing entity to simulate by computer the mechanical switching and signal processing of prior art configurations. Such an enhanced configuration is described below.

Figure 3:
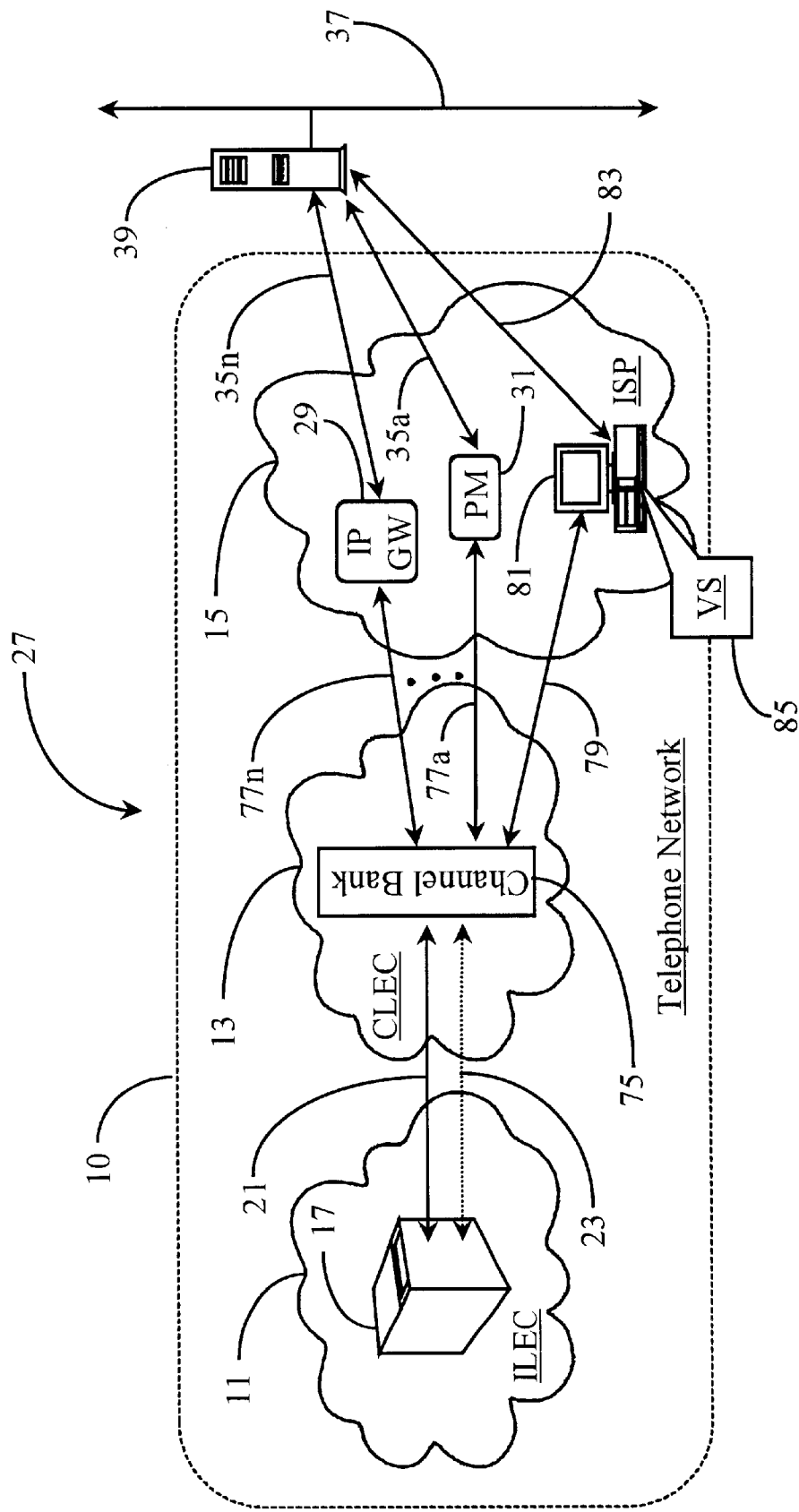
FIG. 3 is an overview of a telephone-exchange system and connected network-bridging system practicing virtual switching according to an embodiment of the present invention.

FIG. 3 is an overview of a telephone-exchange system 27 with a connected network-bridging system 15 practicing virtualized call switching according to an embodiment of the present invention. System 27 comprises many of the same components and architecture already described in FIG. 1. Therefore, only components which are new or modified by the present invention will be newly introduced and labeled with new element numbers herein.

Telephone network 10 comprises ILEC cloud 11 and PABX 17 as was described in FIG. 1. Trunk 21 carries events destined for IP conversion and logical trunk 23 carries the previously described SS-7 signaling. However, in this embodiment, PABX 19 (of FIG. 1) is eliminated and replaced with an un-intelligent channel bank 75. Channel bank 75 is adapted to receive both voice and data events from PABX 17. However, the function of bank 75 is limited to simply dividing trunk 21 into a plurality of smaller local trunks represented herein by element number 77a–n. In this example, 77n represents a local trunk for voice calls and is connected to VoIP gateway 29, which is the VoIP gateway described in FIG. 1. 77a represents a local trunk for data events and is connected to PM 31, which is the data gateway described in FIG. 1.

A personal computer (PC) 81 is provided within the domain of ISP 15 for the purpose of replacing the function of PABX 19 of FIG. 1. PC 81 is connected to channel bank 75 by a bi-directional data and control line 79. Line 79 carries the required SS-7 signaling from PABX 17. The SS-7 signal is simply ported through bank 75, over line 79 and into PC 81. PC 81 has an instance of virtual switch (VS) software 85 resident therein. VS 85 is provided and adapted to receive SS-7 signaling as described above and rout it to VoIP gateway 29 and to PM 31 accordingly. This is accomplished by a separate data connection 83, which connects PC 81 to IP router 39 at backbone 37. The proper SS-7 commands for handling arriving events are routed from IP router 39 over respective data trunks 35a and 35n to PM 31 and VoIP gateway 29 where they may be utilized in respective controllers 65 (FIG. 1) and 47 (FIG. 1) respectively.

By providing PC 81 running VS 85, complete processing command and routing instruction control is provided, eliminating a need for a local PABX switch. In this embodiment, ISP 15 may itself be registered as a CLEC and may host channel bank 75 in cloud 13, perhaps in corporation with the local TELCO. Costs recovered from the elimination of PABX 19 may be passed on to customers subscribing to ISP 15. Similarly, delivery fees from ILEC 11 may be shared between the TELCO formerly hosting PABX 19 and ISP 15.

Figure 4:
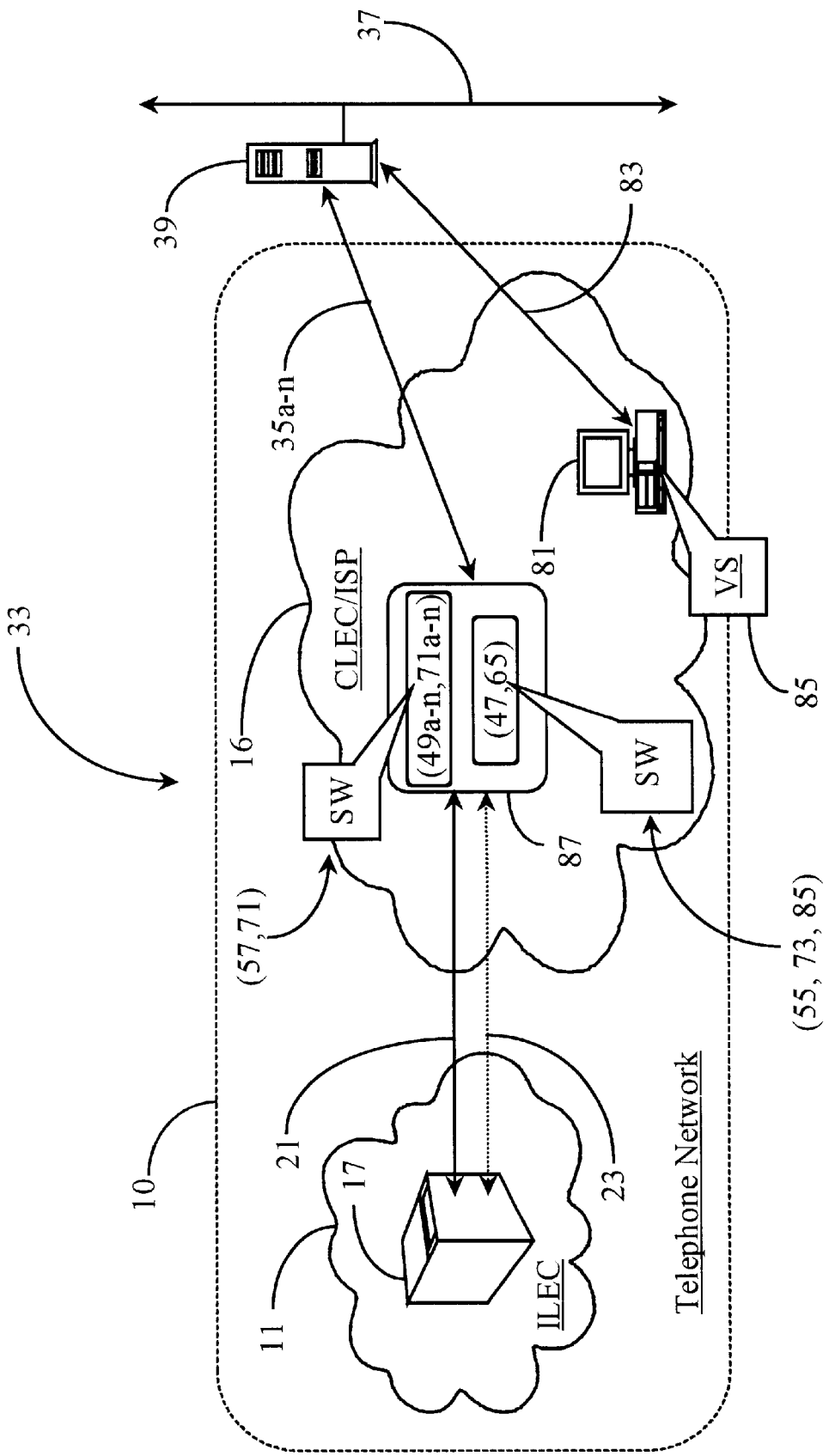
FIG. 4 is an overview of a telephone-exchange system and connected network-bridging system practicing virtual switching according to an alternative embodiment of the present invention.

FIG. 4 is an overview of a telephone-exchange system 33 and connected network-bridging system 16 practicing virtual switching according to another embodiment of the present invention. In this embodiment it is assumed that an ISP 16 functions as a fully registered CLEC independent from a local TELCO. Cloud 16 then comprises CLEC/ISP function and novel components. Telephone network 10 comprises ILEC 11 and PABX 17 as described in FIG. 1 and in FIG. 2.

Trunk 23 carries events from PABX 17 to a novel component described herein as a universal gateway (UIG) 87, which is hosted by ISP 16. Logical trunk 23 provides SS-7 signal as previously described. UIG 87 is adapted to perform all of the function, including SS-7 signal processing, that was accomplished in the embodiment of FIG. 3 by channel bank 75, PC 81, VoIP gateway 29, and PM 31.

UIG 87 is a processor-controlled system having functionality that mirrors the capability of DSP units 49a–n and 61a–n, which may be implemented as separated software functions instead of hardware units. DSP modem functionality represented by software functionality 57 and 71 (from FIG. 2A and FIG. 2B) may be combined into one software instance. Process control capabilities, 47 and 65, which represent controller function, as described in FIGS. 2A and 2B, may be implemented on a same processor within UIG 87. SW instances 55 and 73 (control programs) and VS software 85 are combined and integrated to provide all of the required instruction for data processing and routing according to SS-7 in this embodiment. In this example, it is assumed that the functions of data channeling as described in FIGS. 2A and 2B (43,59), as well as trunk channeling described in FIG. 3 (75) are incorporated into UIG 87.

UIG 87 represents a self-contained bi-directional gateway system capable of handling VoIP events as well as standard data events. UIG 87 is intended by the inventor to be a scaleable system such that it may be expanded or reduced in capacity depending on expected traffic load. Protocol for determining action states relating to VoIP related function or PM function may be executed in a multitasking and integrated environment utilizing known computer-processing techniques.

In still another embodiment, PC 81 may retain VS capability 85 as described in FIG. 3 and may control SS-7 processing and routing within UIG 87. In this case, PC 81 would obtain SS-7 signals from IP router 39 over bi-directional data line 83 and communicate the appropriate commands to UIG 87 back over line 83, IP router 39, and trunks 35a–n. In this respect, PC 81 would be a control station for controlling and maintaining UIG 87 and by virtue of the nature of it's connection, may be placed anywhere on IP backbone 37.

It will be apparent to one with skill in the art that the method and apparatus of the present invention may be practiced between any two types of communication networks wherein bridged data must be processed for entry into the next network without departing from the spirit and scope of the present invention. In a preferred embodiment, the networks represented are a COST network (10) and an EP network (37), which is the Internet. In alternative embodiments, other types of known communication networks may be bridged using the method and apparatus of the present invention with appropriate alterations to facilitate differing protocols inherent in the networks.

The present invention, including method and apparatus, should be provided the broadest possible scope under examination as there are many possible architectural variations and unique applications. The spirit and scope of the present invention is limited only by the claims that follow.

What is claimed is:

1. An Internet service provider system registered as a Competing-Local-Exchange-Carrier (CLEC), and comprising:
   a channel bank for receiving calls from a connection oriented switched telephony (COST) network, and separating the calls into separate channels;
   at least one VoIP gateway connected to an Internet router and to one channel of the channel bank for converting voice call data between a COST protocol and Internet protocol;
   at least one portmaster (PM) node connected to the Internet router and to one channel of the channel bank for converting non-voice data between the COST protocol and the Internet protocol; and
   a computer station executing a virtual switch (VS) software, the computer station connected to the Internet router and to the channel bank;
   characterized in that the computer station controls, via the VS software, the channel bank for separating the COST calls into the separate channels, and also receives and shares SS-7 commands and data with the VoIP gateway and the PM node via the Internet router connected to the PM node and the VoIP gateway, thereby avoiding use of a telephony switching apparatus for receiving and routing calls from the COST network.

2. A method for handling voice and non-voice data calls at an Internet Service Provider (ISP) site between a connection-oriented switched telephony (COST) network and the Internet, without handling the COST calls by a COST switch local to the ISP site, the method comprising steps of:
   (a) substituting a channel bank for the COST switching apparatus local to the ISP;
   (b) operating the channel bank by a computer station in the ISP site, the computer station executing a virtual switch software, to channel incoming COST calls to individual ones of Voice-Over-IP (VoIP) and Portmaster gateways connected to an Internet router; and
   (c) sharing SS-7 commands and data from the COST network with the VoIP and Portmaster gateways by the computer station through a link to the Internet router.

* * * * *